(12) United States Patent
Tomida et al.

(10) Patent No.: US 11,902,428 B2
(45) Date of Patent: Feb. 13, 2024

(54) KEY EXCHANGE SYSTEM, COMMUNICATION APPARATUS, KEY EXCHANGE METHOD AND PROGRAM

(71) Applicants: NIPPON TELEGRAPH AND TELEPHONE CORPORATION, Tokyo (JP); National University Corporation TOYOHASHI UNIVERSITY OF TECHNOLOGY, Aichi (JP)

(72) Inventors: Junichi Tomida, Tokyo (JP); Fumitaka Hoshino, Tokyo (JP); Akira Nagai, Tokyo (JP); Atsushi Fujioka, Kanagawa (JP); Koutarou Suzuki, Aichi (JP)

(73) Assignees: NIPPON TELEGRAPH AND TELEPHONE CORPORATION, Tokyo (JP); NATIONAL UNIVERSITY CORPORATION TOYOHASHI UNIVERSITY OF TECHNOLOGY, Aichi (JP)

( * ) Notice: Subject to any disclaimer, the term of this patent is extended or adjusted under 35 U.S.C. 154(b) by 74 days.

(21) Appl. No.: 17/626,443

(22) PCT Filed: Jul. 16, 2020

(86) PCT No.: PCT/JP2020/027712
§ 371 (c)(1),
(2) Date: Jan. 11, 2022

(87) PCT Pub. No.: WO2021/010444
PCT Pub. Date: Jan. 21, 2021

(65) Prior Publication Data
US 2022/0303124 A1 Sep. 22, 2022

(30) Foreign Application Priority Data
Jul. 17, 2019 (JP) ................................ 2019-132060

(51) Int. Cl.
*H04L 29/06* (2006.01)
*H04L 9/08* (2006.01)
*H04L 9/32* (2006.01)

(52) U.S. Cl.
CPC ............ *H04L 9/0825* (2013.01); *H04L 9/083* (2013.01); *H04L 9/0847* (2013.01); *H04L 9/3242* (2013.01)

(58) Field of Classification Search
CPC ..... H04L 9/0825; H04L 9/083; H04L 9/0847; H04L 9/3242; H04L 9/3226
See application file for complete search history.

(56) References Cited

U.S. PATENT DOCUMENTS

2015/0003615 A1* 1/2015 Vanstone ............... H04L 9/0847
380/282

FOREIGN PATENT DOCUMENTS

CN 1859090 A * 11/2006 ........... H04L 9/0844

OTHER PUBLICATIONS

Smart, Nigel P. "Identity-based authenticated key agreement protocol based on Weil pairing." Electronics letters 38.13 (2002): 630-632. (Year: 2002).*

(Continued)

*Primary Examiner* — Yogesh Paliwal

(57) ABSTRACT

A key exchange system in which a shared key is generated for executing encrypted communication between communication apparatuses according to an authenticated key exchange protocol using ID-based encryption, wherein each communication apparatus includes a memory and a processor configured to generate a short-term private key by using a private key of the communication apparatus; generate a short-term public key of the communication apparatus by using the short-term private key; generate private information on the communication apparatus by using the short-term (Continued)

private key, a short-term public key generated by another communication apparatus, and public information generated by the communication apparatus and said another communication apparatus or public information generated by a key delivering center; and generate the shared key for executing encrypted communication with said another communication apparatus by executing a pairing operation using the private key of the communication apparatus and the private information.

8 Claims, 10 Drawing Sheets

(56) References Cited

OTHER PUBLICATIONS

Machine Translation of CN-1859090-A (Year: 2006).*
Chen et al. (2003) "Identity based authenticated key agreement protocols from pairings", 16th IEEE Computer Security Foundations Workshop, pp. 1-15, retrieved on Sep. 9, 2020, from <https://ieeexplore.ieee.org/document/ 1212715> <doi:10.1109/CSFW.2003. 1212715> in particular, p. 5, left column, lines 24-46, p. 6, left column, lines 7-21.
Tian et al. (2016) "mOT+: An Efficient and Secure Identity Based Diffie-Hellman Protocol over RSA Group", Lecture Notes in Computer Science, Jan. 30, 2016, vol. 9473, pp. 407-421 [online] <doi: 10.1007/978-3-319-27998-5_26> in particular, pp. 411-412.
Smart, N. P. (2002) "Identity-based authenticated key agreement protocol based on Weil pairing", Electronics Letters, Aug. 7, 2002, vol. 38, issue: 13, pp. 630-632 [online] retrieved on Sep. 9, 2020, from <https://ieeexplore.ieee.org/document/1015725> <doi: 10.1049/ el:20020387> in particular, p. 632, left column, lines 1-16.
Fujioka et al. (2013) "id-eCK Secure ID-Based Authenticated Key Exchange on Symmetric and Asymmetric Pairing", IEICE Transactions on Fundamentals of Electronics, Communications and Computer Sciences vol. E96-A No. 6 pp. 1139-1155.
B Ustaoglu (2008) "Obtaining a secure and efficient key agreement protocol from (H)MQV and NAXOS", Designs, Codes and Cryptography, Mar. 2008, vol. 46, Issue 3, pp. 329-342.
Cheng et al. (2005) "On Security Proof of McCullagh-Barreto's Key Agreement Protocol and its Variants", Cryptology ePrint Archive, Report 2005/201.

* cited by examiner

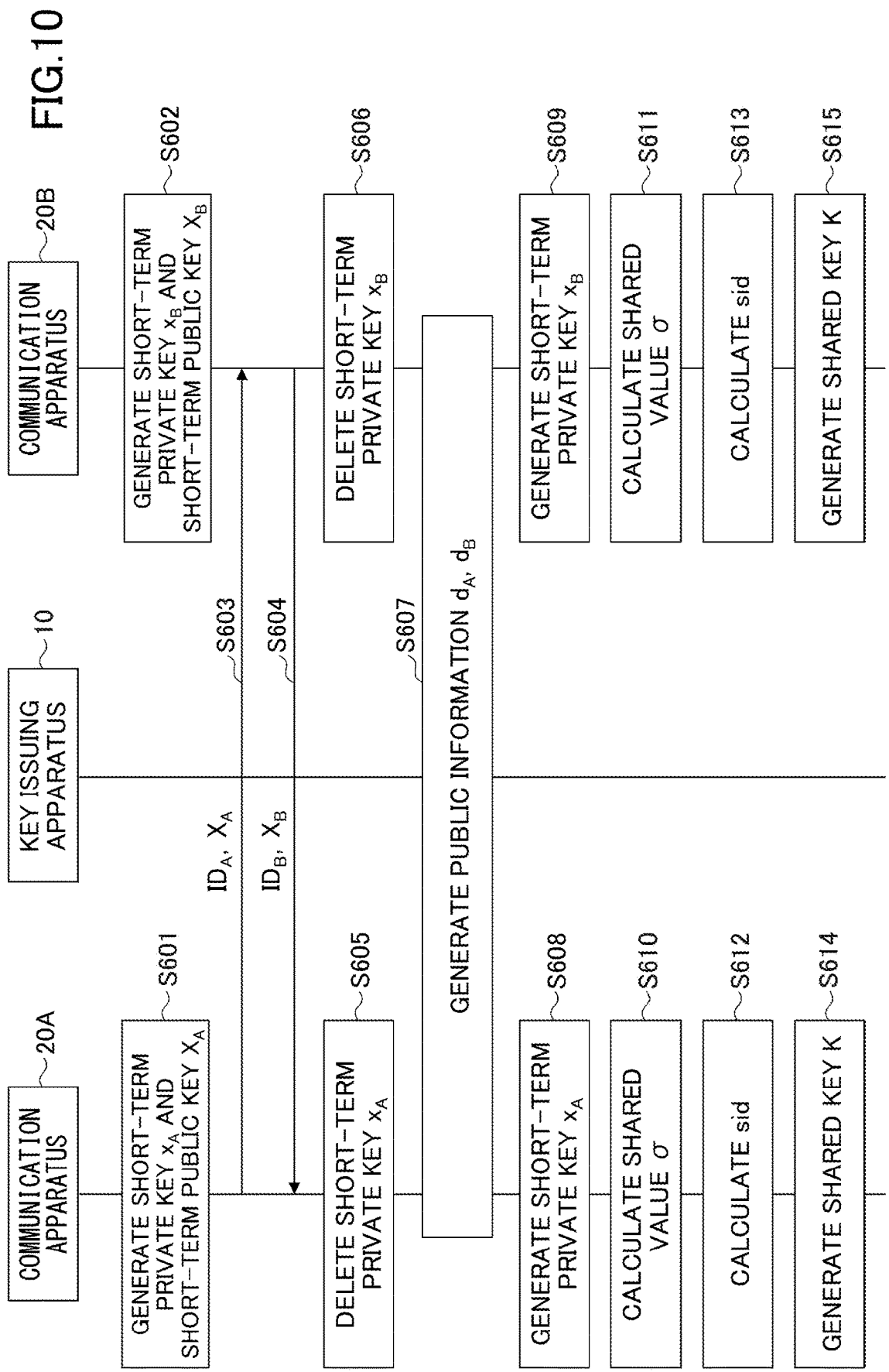

KEY EXCHANGE SYSTEM, COMMUNICATION APPARATUS, KEY EXCHANGE METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2020/027712, filed on 16 Jul. 2020, which application claims priority to and the benefit of JP Application No. 2019-132060, filed on 17 Jul. 2019, the disclosures of which are hereby incorporated herein by reference in their entireties.

TECHNICAL FIELD

The present invention relates to a key exchange system, a communication apparatus, a key exchange method, and a program.

BACKGROUND ART

In recent years, with the widespread use of IoT (Internet of Things) devices, highly important communications have come to be executed on IoT devices. Therefore, authentication techniques to verify whether the respective devices are valid devices upon communication have become important also in the field of IoT devices.

Although passwords, digital certificates, and the like have been known conventionally as authentication techniques for IoT devices, in recent years, introduction of an authenticated key exchange protocol having even higher safety is desired. An authenticated key exchange protocol is a protocol in which a common key (a shared key) is mutually generated upon successful authentication, and encrypted communication can be executed with the shared key. As one of such authenticated key exchange protocols, an authenticated key exchange protocol using ID-based encryption has been known.

As a model of safety that needs to be satisfied by an authenticated key exchange protocol using ID-based encryption, a model referred to as an id-eCK model has been known, which is also known as a model that requires extremely high safety.

Also, the authenticated key exchange protocol using ID-based encryption is generally implemented by using a bilinear group in an elliptic curve on a finite field. Such a bilinear group is also referred to as a pairing group, and can be classified into a symmetric pairing group and an asymmetric pairing group. At present, in the case of using a pairing group in cryptography, an asymmetric pairing group is often used from the viewpoints of efficiency and safety. As an authenticated key exchange protocol using ID-based encryption implemented on an asymmetric pairing group, FSU (Fujioka-Suzuki-Ustaoglu) that has been standardized by ISO/IEC (International Organization for Standardization/International Electrotechnical Commission) has been known (see Non-Patent Document 1).

RELATED ART DOCUMENTS

Non-Patent Documents

[Non-patent document 1] Fujioka, Hoshino, Kobayashi, Suzuki, Ustaoglu, Yoneyama, "id-eCK Secure ID-Based Authenticated Key Exchange on Symmetric and Asymmetric Pairing", IEICE TRANSACTIONS on Fundamentals of Electronics, Communications and Computer Sciences Vol. E96-A No. 6 pp. 1139-1155, 2013

SUMMARY OF INVENTION

Problem to be Solved by the Invention

However, in FSU, operations in a group referred to as pairing operations need to be executed for four times. In general, the pairing operation has a high calculation cost; therefore, in the case where devices having limited calculation resources such as IoT devices execute key exchange by FSU, in some case, the key exchange takes a long time.

In view of the above, an embodiment of the present invention has been devised, and has an object to reduce the calculation cost of an authenticated key exchange protocol using ID-based encryption.

Means for Solving Problems

In order to achieve the object described above, a key exchange system according to an embodiment of the present invention is a key exchange system in which a shared key is generated for executing encrypted communication between a communication apparatus and another communication apparatus from among a plurality of communication apparatuses according to an authenticated key exchange protocol using ID-based encryption, wherein the communication apparatus from among the plurality of communication apparatuses includes a first generation unit configured to generate a short-term private key by using a private key of the communication apparatus; a second generation unit configured to generate a short-term public key of the communication apparatus by using the short-term private key; a third generation unit configured to generate private information on the communication apparatus by using the short-term private key, a short-term public key generated by said another communication apparatus, and public information generated by the communication apparatus and said another communication apparatus or public information generated by a key delivering center; and a fourth generation unit configured to generate the shared key for executing encrypted communication with said another communication apparatus by executing a pairing operation using the private key of the communication apparatus and the private information.

Effects of the Invention

The calculation cost of the authenticated key exchange protocol using ID-based encryption can be reduced.

BRIEF DESCRIPTION OF DRAWINGS

FIG. 10 is a sequence chart illustrating an example of a key exchange process (Application Example 4) in the embodiment according to the present invention.

MODE FOR CARRYING OUT THE INVENTION

In the following, an embodiment according to the present invention will be described. In the embodiment according to the present invention, a key exchange system 1 will be described, in which by reducing the number of pairing operations, the calculation cost is reduced in an authenticated key exchange protocol using ID-based encryption.

<Overall Configuration>

Figure 1:
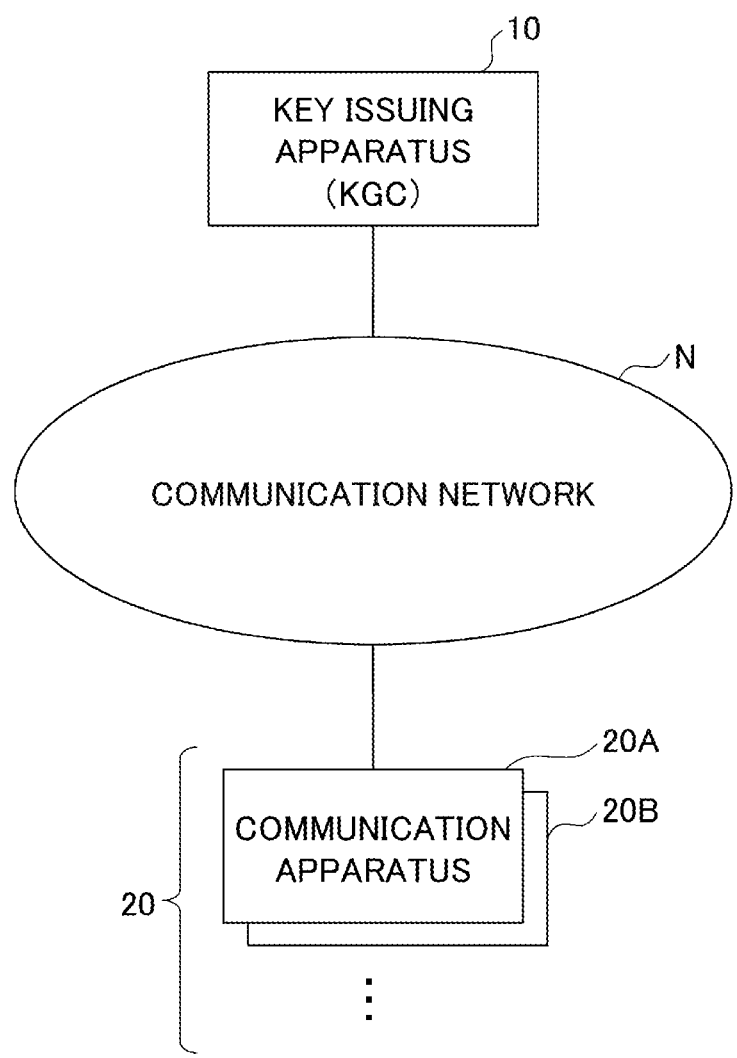
FIG. 1 is a diagram illustrating an example of an overall configuration of a key exchange system in an embodiment according to the present invention.

First, an overall configuration of the key exchange system 1 in the embodiment according to the present invention will be described with reference to FIG. 1. FIG. 1 is a diagram illustrating an example of an overall configuration of the key exchange system 1 in the embodiment according to the present invention.

As illustrated in FIG. 1, the key exchange system 1 in the embodiment according to the present invention includes a key issuing apparatus 10 and multiple communication apparatuses 20. Also, the key issuing apparatus 10 and the communication apparatuses 20 are communicably connected via a communication network N such as the Internet.

The key issuing apparatus 10 is a computer or computer system that functions as a KGC (Key Generation Center). The key issuing apparatus 10 generates in advance a master public key by using a master private key, and makes the master public key public. Also, in the case of receiving the identifier of a communication apparatus 20, the key issuing apparatus 10 generates a user private key from the identifier, and then, delivers the user private key to the communication apparatus 20 corresponding to the identifier.

Note that any identifier can be used as the identifier of the communication apparatus 20. For example, the manufacturing number, IP (Internet Protocol) address, physical address, or the like that is specific to the communication apparatus 20 can be used as the identifier. Other than these, for example, the user ID of the communication apparatus 20, the name of the user of the communication apparatus 20, the email address of the user of the communication apparatus 20, or the like may be used as the identifier.

The communication apparatuses 20 are, for example, various types of IoT devices including various sensor devices, embedded devices, wearable devices, digital household appliances, monitoring cameras, lighting devices, medical devices, industrial devices, and the like. The communication apparatus 20 executes authentication (i.e., verification of the validity) with another communication apparatus 20 by an authenticated key exchange protocol using ID-based encryption, using the user private key delivered from the key issuing apparatus 10, to exchange (generate) keys (shared keys) for encrypted communication. In the following, in the case of distinguishing the multiple communication apparatuses 20, the devices will be referred to as the "communication apparatus 20A", "communication apparatus 20B", and so on.

Note that in the embodiment according to the present invention, an IoT device is assumed as the communication apparatus 20, and the communication apparatus 20 has limited calculation resources (i.e., the performance of a processor and the capacity of a memory are limited compared to those of a general computer and the like). However, the communication apparatus 20 is not limited as such, and the embodiment of the present invention can be applied to the communication apparatus 20 other than an IoT device (e.g., a personal computer (PC), a server device, a smartphone, a tablet, etc.) in substantially the same way.

Further, the configuration of the key exchange system 1 illustrated in FIG. 1 is merely an example, and a different configuration may be adopted. For example, a terminal to transmit the identifier of each communication apparatus 20 to the key issuing apparatus 10 may be included in the key exchange system 1.

<Hardware Configuration>

Next, a hardware configuration of the key issuing apparatus 10 and the communication apparatus 20 in the embodiment according to the present invention will be described.

<<Key Issuing Apparatus 10>>

Figure 2:
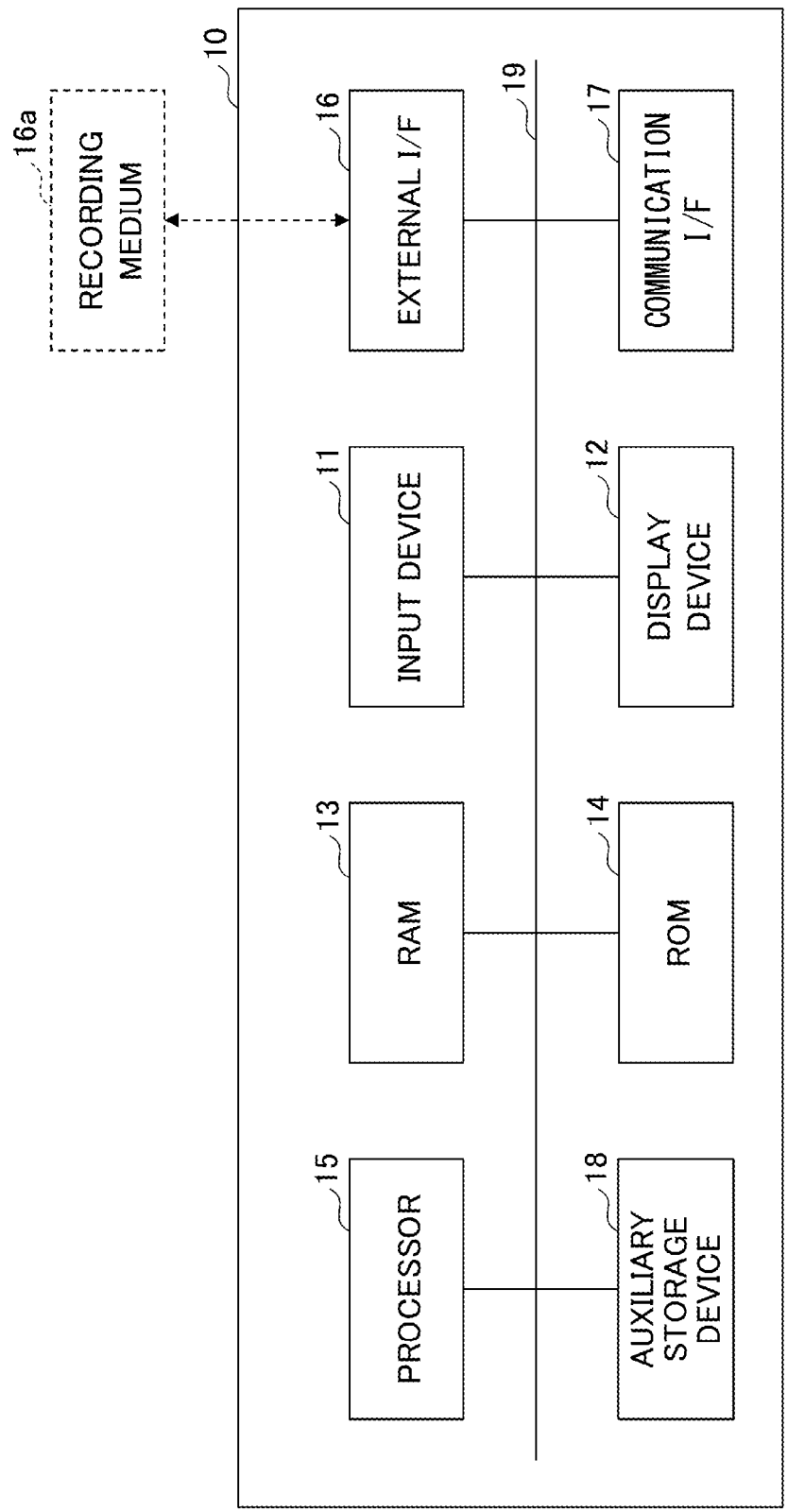
FIG. 2 is a diagram illustrating an example of a hardware configuration of a key issuing apparatus in the embodiment according to the present invention.

In the following, the hardware configuration of the key issuing apparatus 10 in the embodiment according to the present invention will be described with reference to FIG. 2. FIG. 2 is a diagram illustrating an example of a hardware configuration of the key issuing apparatus 10 in the embodiment according to the present invention.

As illustrated in FIG. 2, the key issuing apparatus 10 in the embodiment according to the present invention includes an input device 11, a display device 12, a RAM (Random Access Memory) 13, a ROM (Read-Only Memory) 14, a processor 15, an external I/F 16, a communication I/F 17, and an auxiliary storage device 18. These hardware components are communicably connected via a bus 19.

The input device 11 is, for example, a keyboard, a mouse, a touch panel, or the like, and used by the user for inputting various operations. The display device 12 is, for example, a display or the like, and is used for displaying various processing results and the like for the user. Note that the key issuing apparatus 10 may or may not include at least one of the input device 11 and the display device 12.

The RAM 13 is a volatile semiconductor memory to temporarily hold programs and data. The ROM 14 is a non-volatile semiconductor memory that can hold programs and data even when the a power is turned off. The processor 15 is, for example, a CPU (central processing unit) or the like, and is an arithmetic/logic device to read programs and data from the ROM 14 or the auxiliary storage device 18 onto the RAM 13, to execute processing.

The external I/F 16 is an interface with an external device. The external device includes a recording medium 16a or the like. As the recording medium 16a, a CD (Compact Disc), a DVD (Digital Versatile Disk), an SD memory card (Secure Digital Memory Card), a USB (Universal Serial Bus) memory card, and the like may be enumerated. Note that the recording medium 16a may record one or more programs that implement functions of the key issuing apparatus 10.

The communication I/F 17 is an interface for connecting the key issuing apparatus 10 to the communication network N. The key issuing apparatus 10 can execute data communication with the communication apparatus 20 via the communication I/F 17.

The auxiliary storage device 18 is a non-volatile storage device such as an HDD (hard disk drive), an SSD (solid state drive), or the like. The auxiliary storage device 18 stores one or more programs that implement the functions of the key issuing apparatus 10.

By having the hardware configuration illustrated in FIG. 2, the key issuing apparatus 10 in the embodiment according to the present invention can implement a key issuance process and the like that will be described later. Note that although FIG. 2 illustrates the case where the key issuing apparatus 10 in the embodiment according to the present invention is implemented by a single apparatus (computer), it is not limited as such. The key issuing apparatus 10 in the embodiment according to the present invention may be implemented by multiple apparatuses (computers). Also, the single device (computer) may include multiple processors 15 and multiple memories (e.g., RAMs 13, ROMs 14, auxiliary storage devices 18, etc.).

<<Communication Apparatus 20>>

Figure 3:
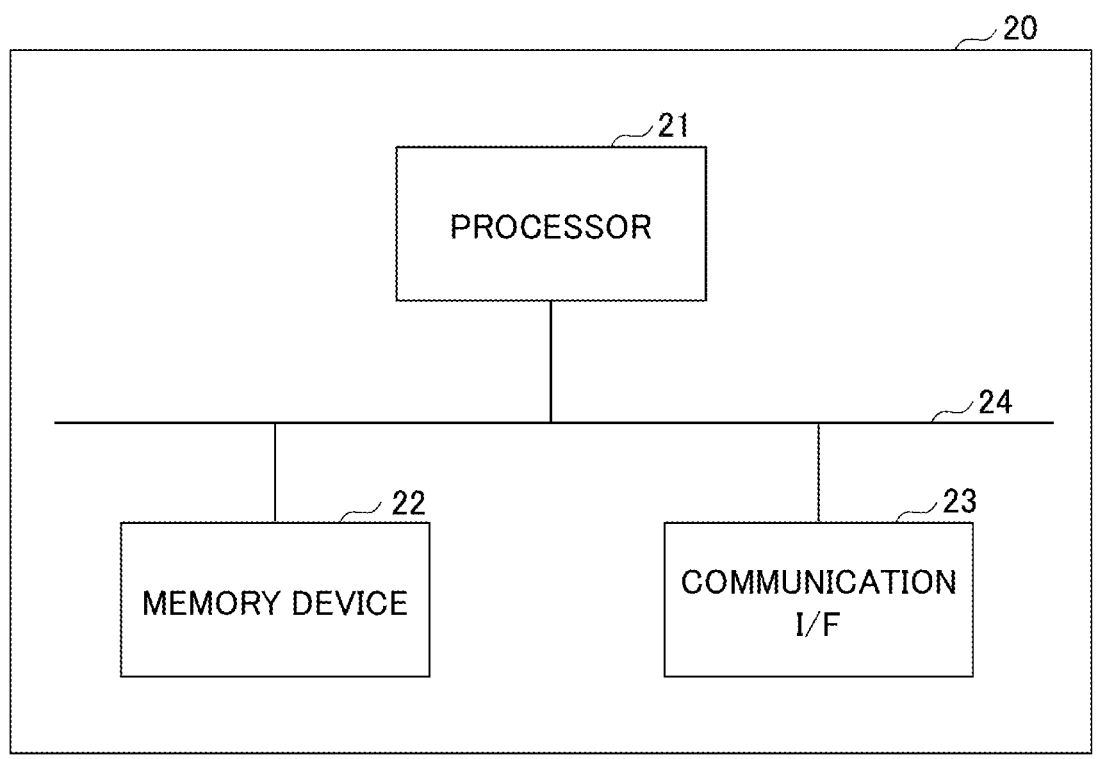
FIG. 3 is a diagram illustrating an example of a hardware configuration of a communication apparatus in the embodiment according to the present invention.

In the following, the hardware configuration of the communication apparatus 20 in the embodiment according to the present invention will be described with reference to FIG. 3. FIG. 3 is a diagram illustrating an example of a hardware configuration of the communication apparatus 20 in the embodiment according to the present invention.

As illustrated in FIG. 3, the communication apparatus 20 in the embodiment according to the present invention includes a processor 21, a memory device 22, and a communication I/F 23. These hardware components are communicably connected via a bus 24.

The processor 21 is, for example, an MPU (Micro Processing Unit), a CPU, or the like, and is an arithmetic/logic device that reads programs and data from the memory device 22, to execute processing.

The memory device 22 is, for example, a RAM, a ROM, a flash memory, or the like, to store various items of data and programs. The memory device 22 stores one or more programs that implement the functions of the communication apparatus 20 in the embodiment according to the present invention.

The communication I/F 23 is an interface for connecting the communication apparatus 20 to the communication network N. The communication apparatus 20 can execute data communication with the other communication apparatuses 20, the key issuing apparatus 10, and the like via the communication I/F 23.

By having the hardware configuration illustrated in FIG. 3, the communication apparatus 20 in the embodiment according to the present invention can implement a key exchange process and the like that will be described later.

<Functional Configuration>

Figure 4:
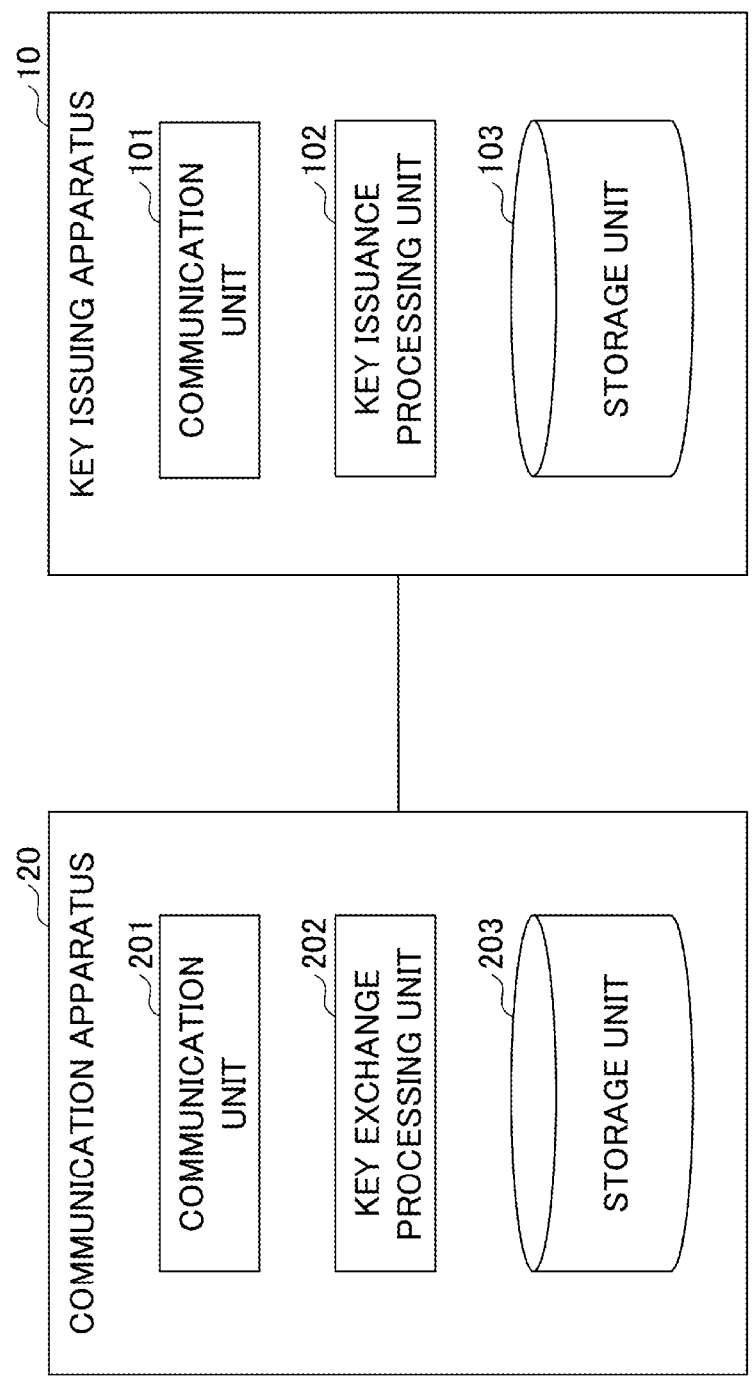
FIG. 4 is a diagram illustrating an example of a functional configuration of the key exchange system in the embodiment according to the present invention.

Next, a functional configuration of the key exchange system 1 in the embodiment according to the present invention will be described with reference to FIG. 4. FIG. 4 is a diagram illustrating an example of a functional configuration of the key exchange system 1 in the embodiment according to the present invention.

<<Key Issuing Apparatus 10>>

As illustrated in FIG. 4, the key issuing apparatus 10 in the embodiment according to the present invention includes a communication unit 101 and a key issuance processing unit 102. These units are implemented by one or more programs installed in the key issuing apparatus 10 that causes the processor 15 to execute processing.

The key issuing apparatus 10 in the embodiment according to the present invention also includes a storage unit 103. The storage unit 103 can be implemented by using, for example, the auxiliary storage device 18 or the like. Note that the storage unit 103 may be implemented by using a storage device or the like connected to the key issuing apparatus 10 via the communication network N.

The communication unit 101 executes various communications with the communication apparatus 20 and the like. In the case of receiving the identifier of a communication apparatus 20, the key issuance processing unit 102 generates a user private key from the identifier, and then, delivers the user private key to the communication apparatus 20 corresponding to the identifier. The storage unit 103 stores various items of data (e.g., master public keys, master private keys, etc.).

<<Communication Apparatus 20>>

As illustrated in FIG. 4, the communication apparatus 20 in the embodiment according to the present invention includes a communication unit 201 and a key exchange processing unit 202.

The communication unit 201 executes various types of communication with another communication apparatus 20, the key issuing apparatus 10, and the like. The key exchange processing unit 202 executes authentication with another communication apparatus 20 by the authenticated key exchange protocol using ID-based encryption, using the user private key delivered from the key issuing apparatus 10, to exchange the shared keys. The storage unit 203 stores various items of data (e.g., a user private key, etc.)

<Details of Processing on the Key Exchange System 1>

Next, processing executed on the key exchange system 1 in the embodiment according to the present invention will be described in detail. Note that in the following Application Examples 1 to 3, authenticated key exchange protocols using ID-based encryption on an asymmetric pairing group will be described, and in Application Example 4, an authenticated key exchange protocol using ID-based encryption on a symmetric pairing group will be described.

Application Example 1

In the following, Application Example 1 will be described.

Definition of Symbols

First, symbols used in Application example 1 are defined as follows. Note that in Application Examples 2 and 3, substantially the same symbols as defined in Application Example 1 will be used.

$ID_A$: the identifier of the communication apparatus 20A
$ID_B$: the identifier of the communication apparatus 20B
$D_A$: the user private key of the communication apparatus 20A
$D_B$: the user private key of the communication apparatus 20B
k: a security parameter
p, q: prime numbers satisfying $p \neq q$
$G_1$: a subgroup of a group $E(F_p)$ on an elliptic curve $E_1$ where the elliptic curve $E_1$ is on a finite field $F_p$
$G_2$: a subgroup of a group on an elliptic curve $E_2$ where the elliptic curve $E_2$ is on a k-th extension field of the finite field $F_p$, and the group is formulated as follows:

$$E(F_{p^k})$$ [Formula 1]

$g_1$: a generator of $G_1$
$g_2$: a generator of $G_2$
$Z_q$: cosets modulo q
$z \in Z_q$: a master private key
$Z=zg1$: a master public key
$H_1$: a function to generate elements on $Z_q$ from a string (e.g., an octet string)
$H_2$: a function to generate elements on $Z_q$ from a string
$H_3$: a function to generate elements on $Z_q$ from a string
H: a key derivation function
K: a shared key
e: a pairing operation defined on $G_1 \times G_2$ Here, among the symbols defined as described above, all but the master private key z and the user private keys $D_A$ and $D_B$ are public information. Note that $G_1$ and $G_2$ may be reversed. Also, in the case of inputting an element of a group or an element of $Z_q$ into a function, it is assumed that a string representing the element is input into the function.

Key Issuance Process (Application Example 1)

Figure 5:
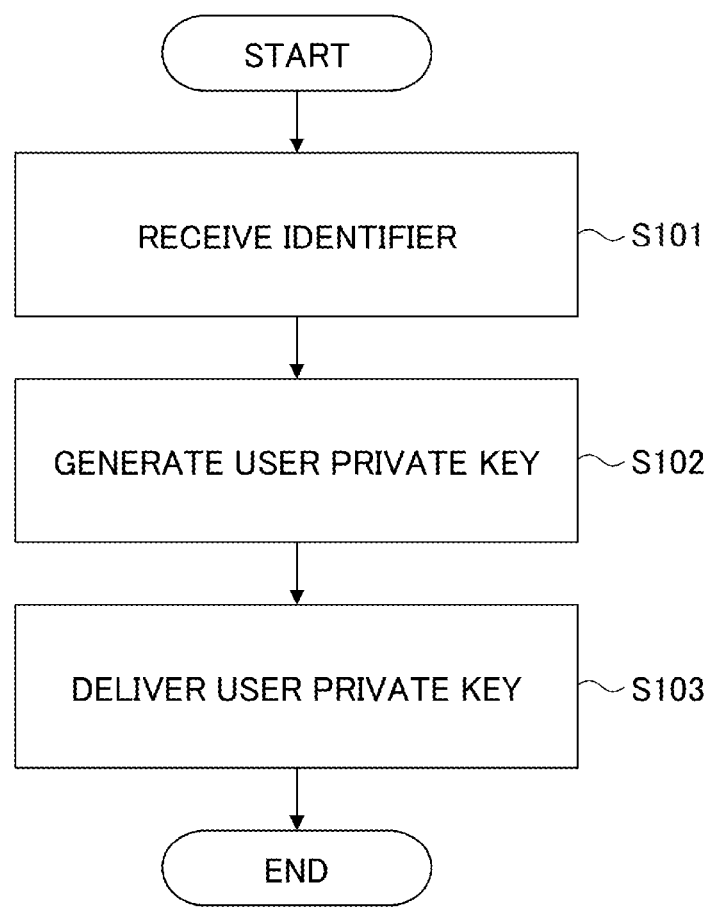
FIG. 5 is a flow chart illustrating an example of a key issuance process (Application Example 1) in the embodiment according to the present invention.

First, a key issuance process for generating a user private key (Application Example 1) will be described with reference to FIG. 5. FIG. 5 is a flow chart illustrating an example of a key issuance process (Application Example 1) in the embodiment according to the present invention. In the following, as an example, a case of issuing a user private key $D_A$ and a user private key $D_B$ will be described.

At Step S101, the key issuance processing unit 102 receives the identifier $ID_A$ of the communication apparatus 20A and the identifier $ID_B$ of the communication apparatus 20B. The identifier of each of the communication apparatuses 20 may be transmitted, for example, from the communication apparatus 20, may be transmitted from a terminal or the like connected to the key issuing apparatus 10 via the communication network N, or may be input on the input device 11 included in the key issuing apparatus 10.

Next, at Step S102, the key issuance processing unit 102 generates user private keys $D_A$ and $D_B$ by the following formulas:

$$D_A = \frac{1}{z+i_A} g_2 \quad \text{[Formula 2]}$$

$$D_B = \frac{1}{z+i_B} g_2 \quad \text{[Formula 3]}$$

where $i_A = H_1(ID_A)$ and $i_B = H_1(ID_B)$. These $i_A$ and $i_B$ may be generated on the communication apparatuses 20, or may be generated on the key issuing apparatus 10. In other words, for example, when generating a user private key $D_A$, $i_A$ may be generated on the communication apparatus 20 and made public to the key issuing apparatus 10, or $i_A$ may be generated on the key issuing apparatus 10. Similarly, for example, when generating a private key $D_B$, $i_B$ may be generated on the communication apparatus 20 and made public to the key issuing apparatus 10, or $i_B$ may be generated on the key issuing apparatus 10. Note that although it is convenient to generate $i_A$ and $i_B$ on the communication apparatus 20A and the communication apparatus 20B, respectively, for example, in the case where the calculation resources of the communication apparatus 20 are limited and considerable calculation resources are required for the calculation of $H_1$, it is favorable to generate $i_A$ and $i_B$ on the key issuing apparatus 10.

Next, at Step S103, the key issuance processing unit 102 delivers the user private key $D_A$ to the communication apparatus 20A, and delivers the user private key $D_B$ to the communication apparatus 20B. Note that the key issuance processing unit 102 may deliver the user private keys by any method. For example, in response to a request for delivering the user private key from the communication apparatus 20, the key issuance processing unit 102 may cause the communication unit 101 to transmit a corresponding user private key to the communication apparatus 20, so as to deliver the user private key. Alternatively, the user private key may be recorded on a recording medium or the like, and then, delivered to the communication apparatus 20. In this way, each communication apparatus 20 can obtain a user private key used for exchanging (generating) shared keys with another communication apparatus 20.

Key Exchange Process (Application Example 1)

Figure 6:
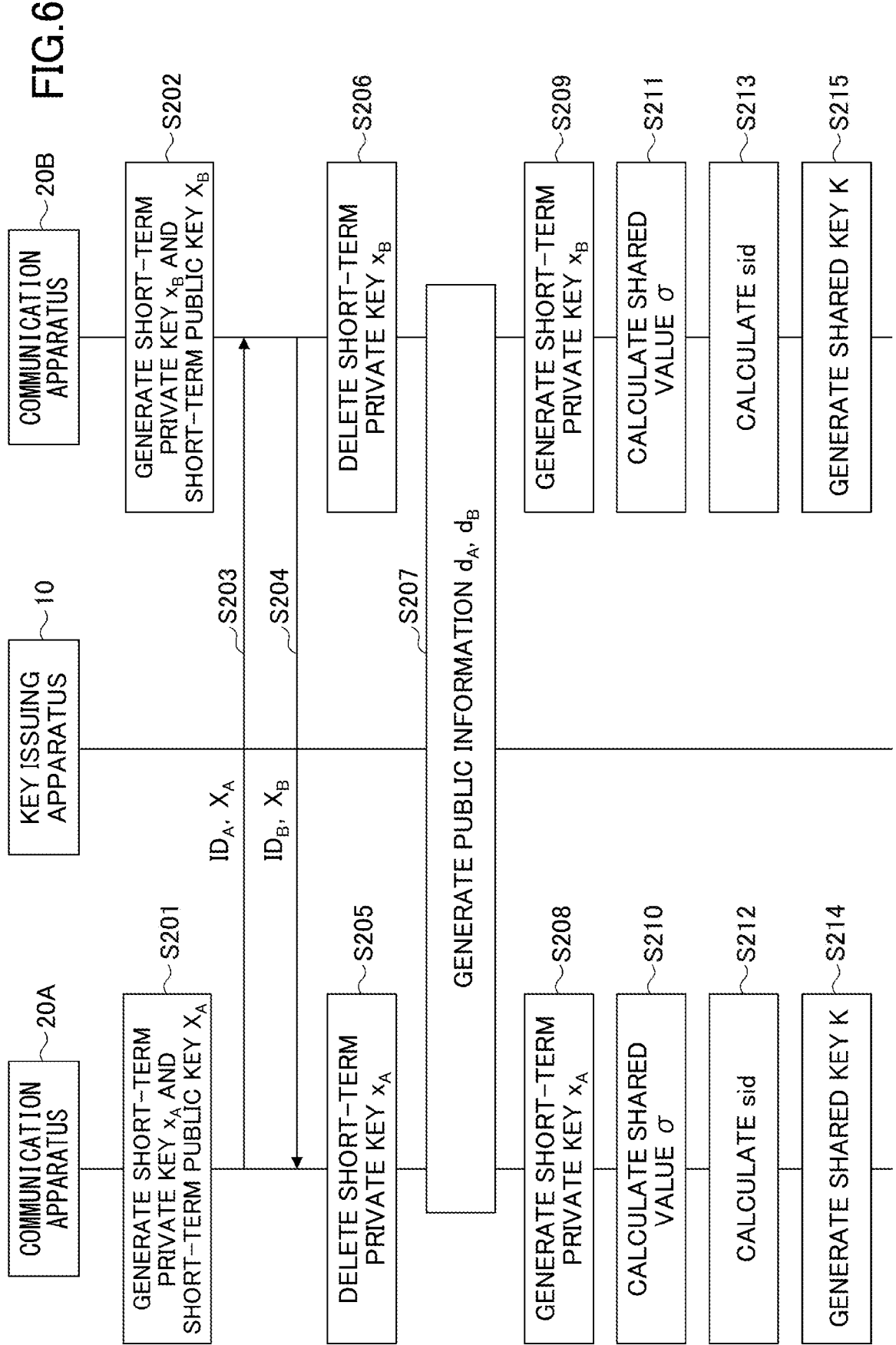
FIG. 6 is a sequence chart illustrating an example of a key exchange process (Application Example 1) in the embodiment according to the present invention.

Next, a key exchange process (Application Example 1) for executing authentication between the communication apparatuses 20 by an authenticated key exchange protocol using ID-based encryption to exchange shared keys will be described with reference to FIG. 6. FIG. 6 is a sequence chart illustrating an example of a key exchange process (Application Example 1) in the embodiment according to the present invention. In the following, as an example, a case will be described in which shared keys are exchanged (generated) between the communication apparatus 20A and the communication apparatus 20B.

The key exchange processing unit 202 of the communication apparatus 20A randomly selects $r_A \in Z_q$, and then, generates a short-term private key as follows, $$x_A = H_2(D_A \| r_A) \quad \text{[Formula 4]}$$

where $\|$ denotes concatenation of strings.

and at Step S201, generates a short-term public key $X_A = x_A (z+i_B)g_1$. Note that the short-term private key $x_A$ and the short-term public key $X_A$ are stored in the storage unit 203 of the communication apparatus 20A.

Similarly, the key exchange processing unit 202 of the communication apparatus 20B randomly selects $r_B \in Z_q$, and then, generates a short-term private key as follows, $$x_B = H_2(D_B \| r_B) \quad \text{[Formula 5]}$$

and at Step S202, generates a short-term public key $X_B = x_B (z+i_A)g_1$. Note that the short-term private key $x_B$ and the short-term public key $X_B$ are stored in the storage unit 203 of the communication apparatus 20B.

Next, at Step S203, the communication unit 201 of the communication apparatus 20A transmits the identifier $ID_A$ and the short-term public key $X_A$ to the communication apparatus 20B. Similarly, at Step S204, the communication unit 201 of the communication apparatus 20B transmits the identifier $ID_B$ and the short-term public key $X_B$ to the communication apparatus 20A. By these steps, the identifiers and the short-term public keys are exchanged between the communication apparatuses 20.

Next, at Step S205, the key exchange processing unit 202 of the communication apparatus 20A deletes the short-term private key $x_A$ generated at Step S201 described above from the storage unit 203. Similarly, at Step S206, the key exchange processing unit 202 of the communication apparatus 20B deletes the short-term private key $x_B$ generated at Step S202 described above from the storage unit 203.

Note that the short-term private key $x_A$ and the short-term private key $x_B$ are deleted at Step S205 and Step S206 described above, respectively, in order to prevent the short-term private keys from leaking out before receiving the identifier and the short-term public key from the other communication apparatus 20. In other words, for example, after the communication apparatus 20A has transmitted the identifier $ID_A$ and the short-term public key $X_A$ to the communication apparatus 20B, it may take some time until the communication apparatus 20A receives the identifier $ID_B$ and the short-term public key $X_B$ from the communication apparatus 20B. Therefore, in order to prevent a leak of the short-term private key $x_A$ during this time, the communication apparatus 20A deletes the short-term private key $x_A$ after having transmitted the identifier $ID_A$ and the short-term public key $X_A$ to the communication apparatus 20B. The reason for deleting the short-term private key $x_B$ is the same.

Next, at Step S207, the key exchange processing unit 202 of the communication apparatus 20 or the key issuing apparatus 102 of the key issuing apparatus 10 generates public information $d_A$ and $d_B$ as follows:

$$d_A = H_3(X_A, ID_A, ID_B)$$

$$d_B = H_3(X_B, ID_A, ID_B)$$

Here, $d_A$ and $d_B$ described above may be generated by the communication apparatuses 20, or may be generated by the key issuing apparatus 10. In other words, for example, the generation may be implemented such that the communication apparatus 20A generates $d_A$ and $d_B$, and the communication apparatus 20B generates $d_A$ and $d_B$; or the key issuing apparatus 10 generates $d_A$ and $d_B$ and makes these public to the communication apparatus 20A and the communication apparatus 20B. Alternatively, for example, the generation may be implemented such that the communication apparatus 20A generates $d_A$ and makes it public, and the communication apparatus 20B generates $d_B$ and makes it public. Note that although it is convenient to generate $d_A$ and $d_B$ on the communication apparatus 20A and the communication apparatus 20B, respectively, for example, in the case where the calculation resources of the communication apparatus 20 are limited and considerable calculation resources are required for the calculation of $H_3$, it is favorable to generate $d_A$ and $d_B$ on the key issuing apparatus 10.

Note that the timing to generate the public information $d_A$ and $d_B$ may be any timing as long as it is after the generation of the short-term public keys $X_A$ and $X_B$ and before the generation of the shared value σ that will be described later.

Next, at Step S208, the key exchange processing unit 202 of the communication apparatus 20A generates again a short-term private key as follows:

$$x_A = H_2(D_A \| r_A) \quad \text{[Formula 6]}$$

Note that the short-term private key $x_A$ is stored in the storage unit 203 of the communication apparatus 20A.

Similarly, at Step S209, the key exchange processing unit 202 of the communication apparatus 20B generates again a short-term private key as follows:

$$x_B = H_2(D_B \| r_B) \quad \text{[Formula 7]}$$

Note that the short-term private key $x_B$ is stored in the storage unit 203 of the communication apparatus 20B.

Next, at Step S210, the key exchange processing unit 202 of the communication apparatus 20A calculates a shared value σ as follows:

$$F_A = (x_A + d_A)(X_B + d_B(z + i_A)g_1)$$

$$\sigma = e(F_A, D_A)$$

Similarly, at Step S211, the key exchange processing unit 202 of the communication apparatus 20B calculates a shared value σ as follows:

$$F_B = (x_B + d_B)(X_A + d_A(z + i_B)g_1)$$

$$\sigma = e(F_B, D_B)$$

Next, at Step S212, the key exchange processing unit 202 of the communication apparatus 20A calculates sid as follows, where sid means the session ID.

$$\text{sid} = (ID_A \| ID_B \| X_A \| X_B) \quad \text{[Formula 8]}$$

Similarly, at Step S213, the key exchange processing unit 202 of the communication apparatus 20B calculates sid as follows:

$$\text{sid} = (ID_A \| ID_B \| X_A \| X_B) \quad \text{[Formula 9]}$$

Note that at Step S212 and Step S213 described above, sid needs to be the same between the communication apparatus 20A and the communication apparatus 20B; therefore, for example, an arrangement may be made in advance to define $ID_A$ as the sender and $ID_B$ as the receiver when executing encrypted communication, to have the same sid; or $ID_A$, $ID_B$, $X_A$, and $X_B$ may be sorted in alphabetic order, and concatenated, to have the same sid. Also, at this time, in addition to $ID_A$, $ID_B$, $X_A$, and $X_B$, for example, a master public key Z may be added, or the protocol or the algorithm name may be added.

Finally, at Step S214, the key exchange processing unit 202 of the communication apparatus 20A generates a shared key K as follows:

$$K = H(\sigma \| \text{sid}) \quad \text{[Formula 10]}$$

Note that the shared key K is stored in the storage unit 203 of the communication apparatus 20A.

Similarly, at Step S215, the key exchange processing unit 202 of the communication apparatus 20B generates a shared key K as follows:

$$K = H(\sigma \| \text{sid}) \quad \text{[Formula 11]}$$

Note that the shared key K is stored in the storage unit 203 of the communication apparatus 20B.

In this way, the shared key K is shared between the communication apparatus 20A and the communication apparatus 20B. Therefore, by using this shared key K, encrypted communication can be executed between the communication apparatus 20A and the communication apparatus 20B.

Application Example 2

In the following, Application Example 2 will be described. Any one of $ID_A$, $ID_B$, $X_A$, and $X_B$ is public information, and hence, sid as a concatenation of these strings is also public information. Thereupon, in Application Example 2, a case will be described in which a shared key K is generated without using sid. Note that as the key issuance process is substantially the same as in Application Example 1, the description is omitted. Also, as for the symbols, substantially the same symbols as defined in Application Example 1 will be used.

Key exchange process (Application Example 2)

Figure 7:
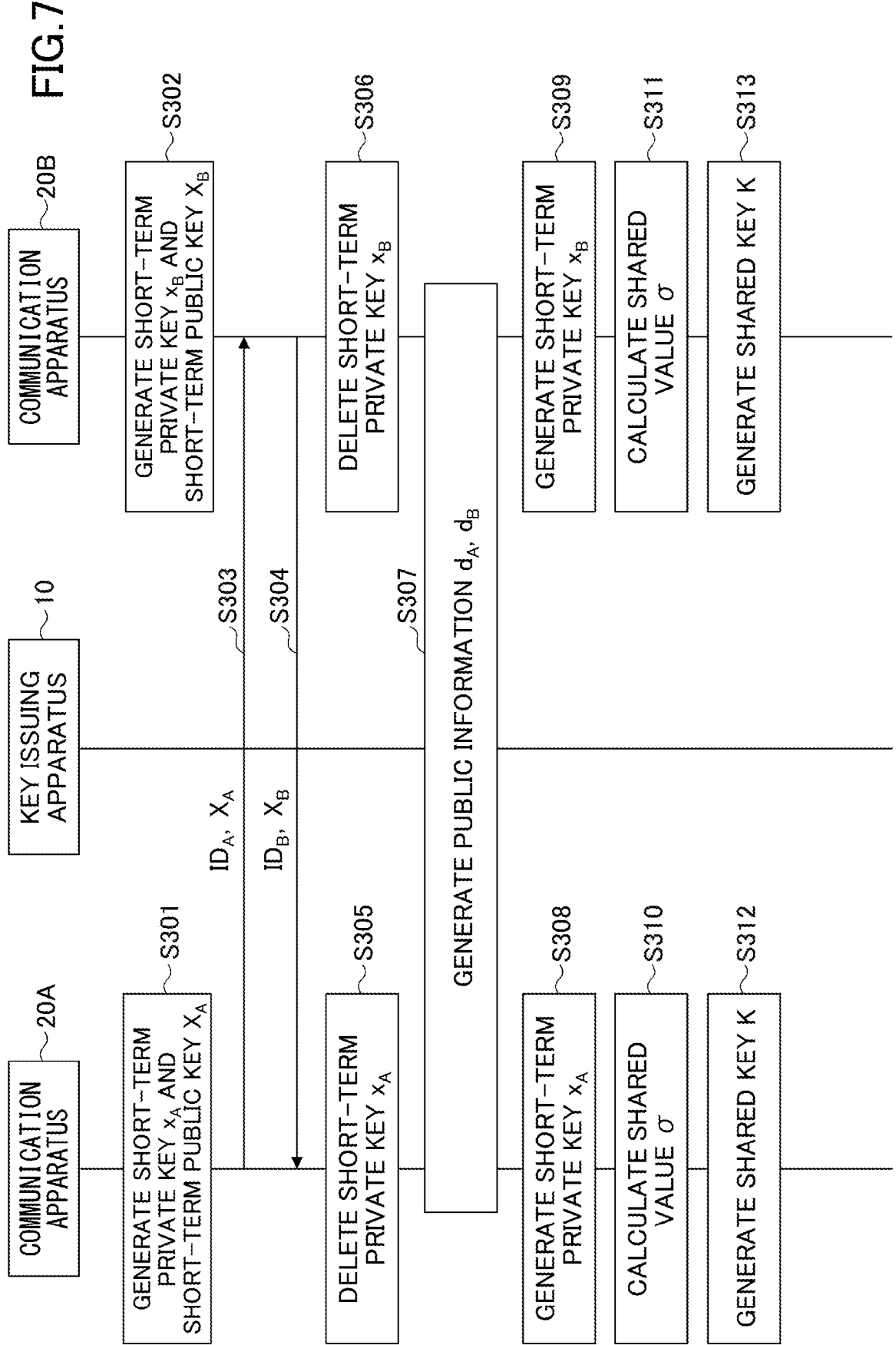
FIG. 7 is a sequence chart illustrating an example of a key exchange process (Application Example 2) in the embodiment according to the present invention.

A key exchange process (Application Example 2) for executing authentication between the communication apparatuses 20 by an authenticated key exchange protocol using ID-based encryption, to exchange shared keys will be described with reference to FIG. 7. FIG. 7 is a sequence chart illustrating an example of a key exchange process (Application Example 2) in the embodiment according to the present invention. In the following, as an example, a case will be described in which shared keys are exchanged (generated) between the communication apparatus 20A and the communication apparatus 20B.

As Step S301 to Step S311 in FIG. 7 are substantially the same as Step S201 to Step S211 in FIG. 6, respectively, the description is omitted.

At Step S312, the key exchange processing unit 202 of the communication apparatus 20A generates a shared key K as follows:

$$K=H(\sigma)$$

Note that the shared key K is stored in the storage unit 203 of the communication apparatus 20A.

Similarly, at Step S313, the key exchange processing unit 202 of the communication apparatus 20B generates a shared key K as follows:

$$K=H(\sigma)$$

Note that the shared key K is stored in the storage unit 203 of the communication apparatus 20B.

In this way, the shared key K is shared between the communication apparatus 20A and the communication apparatus 20B. Therefore, by using this shared key K, encrypted communication can be executed between the communication apparatus 20A and the communication apparatus 20B.

Application Example 3

In the following, Application Example 3 will be described. In Application Example 3, a case will be described in which a key is generated by using a mask generation function (MGF) as the key derivation function, and then, the MAC (Message Authentication Code) value of this key is verified, to confirm whether the same key K is generated between the communication apparatuses 20. Note that as the key issuance process is substantially the same as in Application Example 1, the description is omitted. Also, as for the symbols, substantially the same symbols as defined in Application Example 1 will be used.

Key Exchange Process (Application Example 3)

Figure 8:
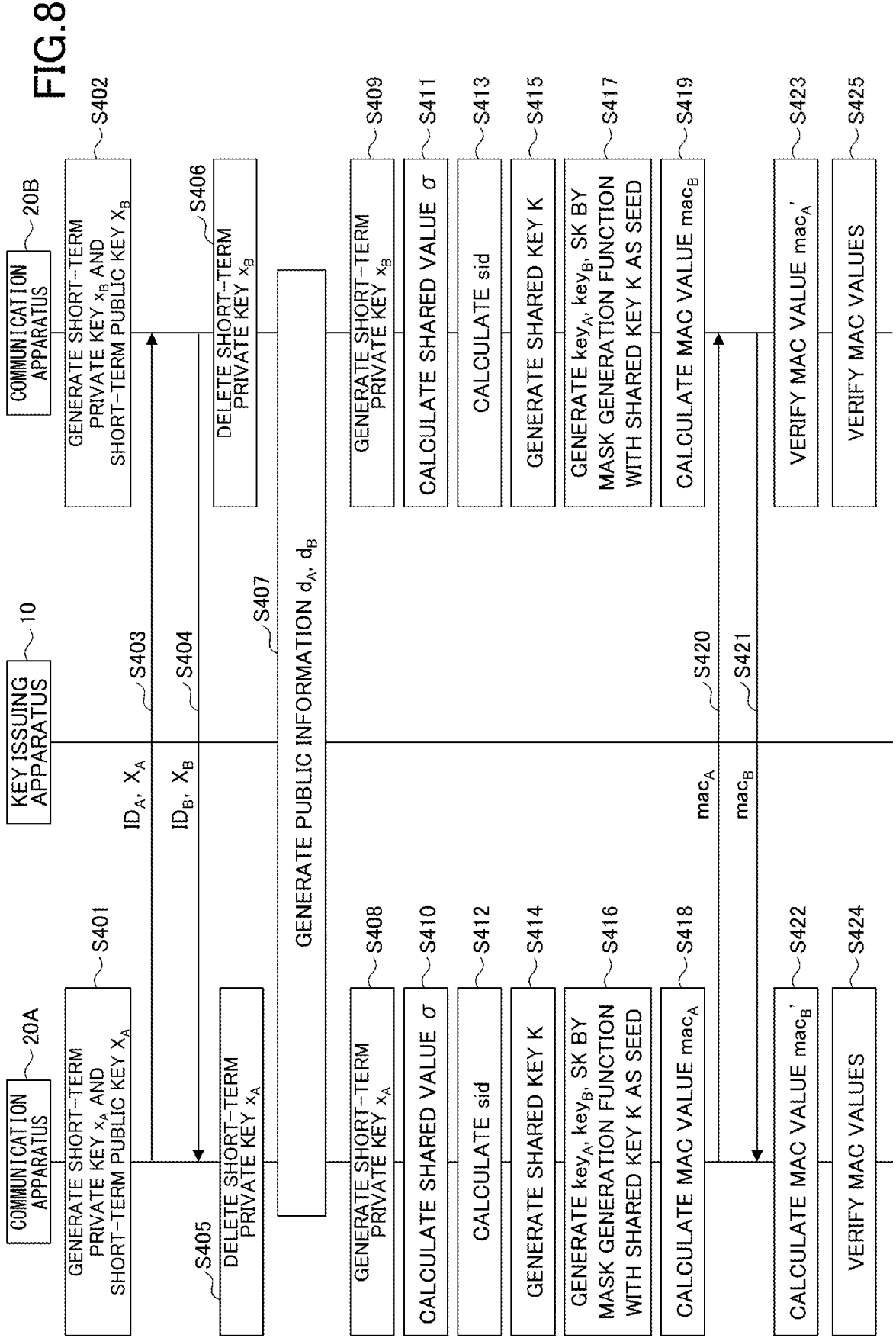
FIG. 8 is a sequence chart illustrating an example of a key exchange process (Application Example 3) in the embodiment according to the present invention.

A key exchange process (Application Example 3) for executing authentication between the communication apparatuses 20 by an authenticated key exchange protocol using ID-based encryption, to exchange shared keys will be described with reference to FIG. 8. FIG. 8 is a sequence chart illustrating an example of a key exchange process (Application Example 3) in the embodiment according to the present invention. In the following, as an example, a case will be described in which shared keys are exchanged (generated) between the communication apparatus 20A and the communication apparatus 20B.

As Step S401 to Step S415 in FIG. 8 are substantially the same as Step S201 to Step S215 in FIG. 6, respectively, the descriptions are omitted.

At Step S416, the key exchange processing unit 202 of the communication apparatus 20A generates three keys $key_A$, $key_B$, and SK by the mask generation function using the shared key K generated at Step S414 as the seed. In other words, the key exchange processing unit 202 generates the keys $key_A$, $key_B$, and SK as follows:

$$(key_A, key_B, SK) = MGF1(K, n)$$

Here, MGF1 is a mask generation function that takes as input a seed (K in the above) and a mask length n, to output a mask. In Application Example 3, for example, by dividing the mask having the mask length n into three equal sections, $key_A$, $key_B$, and SK are generated. For example, in the case of n=768, the mask is divided at 256-bit boundaries, to generate a 256-bit key $key_A$, a 256-bit key $key_B$, and a 256-bit key SK. Note that as will be described later, in Application Example 3, the key SK is the key used for encrypted communication between the communication apparatus 20A and the communication apparatus 20B.

Similarly, at Step S417, the key exchange processing unit 202 of the communication apparatus 20B generates three keys $key_A$, $key_B$, and SK by the mask generation function using the shared key K generated at Step S415 as the seed. In other words, the key exchange processing unit 202 generates the keys $key_A$, $key_B$, and SK as follows:

$$(key_A, key_B, SK) = MGF1(K, n)$$

As described above, in Application Example 3, for example, by dividing the mask (i.e., output of MGF1) having a mask length n into three equal sections, $key_A$, $key_B$, and SK are generated. For example, in the case of n=768, the mask is divided at 256-bit boundaries, to generate a 256-bit key $key_A$, a 256-bit key $key_B$, and a 256-bit key SK.

Next, at Step S418, the key exchange processing unit 202 of the communication apparatus 20A calculates a MAC value $mac_A$ of sid as follows, by using the key $key_A$ generated at Step S416 described above.

$$mac_A = MAC(key_A, sid)$$

where MAC is a MAC function.

Similarly, at Step S419, the key exchange processing unit 202 of the communication apparatus 20B calculates a MAC value $mac_B$ of sid as follows, by using the key $key_B$ generated at Step S417 described above.

$$mac_B = MAC(key_B, sid)$$

Next, at Step S420, the communication unit 201 of the communication apparatus 20A transmits the MAC value $mac_A$ to the communication apparatus 20B. Similarly, at Step S421, the communication unit 201 of the communication apparatus 20B transmits the MAC value $mac_B$.

Next, at Step S422, the key exchange processing unit 202 of the communication apparatus 20A calculates a MAC value $mac_B'$ of sid as follows, by using the key $key_B$ generated at Step S416 described above.

$$mac_B' = MAC(key_B, sid)$$

Similarly, at Step S423, the key exchange processing unit 202 of the communication apparatus 20B calculates a MAC value $mac_A'$ of sid as follows, by using the key $key_A$ generated at Step S417 described above.

$$mac_A' = MAC(key_A, sid)$$

Finally, at Step S424, the key exchange processing unit 202 of the communication apparatus 20A verifies whether the MAC value $mac_B$ transmitted from the communication apparatus 20B at Step S421 described above is equal to the MAC value $mac_B'$ generated at Step S422 described above. If this verification is successful (i.e., if $mac_B = mac_B'$), it is guaranteed that the same shared key K and the same key SK are generated between the communication apparatus 20A and the communication apparatus 20B.

Similarly, at Step S425, the key exchange processing unit 202 of the communication apparatus 20B verifies whether the MAC value mac$_A$ transmitted from the communication apparatus 20B at Step S420 described above is equal to the MAC value mac$_A$' generated at Step S423 described above. If this verification is successful (i.e., if mac$_B$=mac$_B$'), it is guaranteed that the same shared key K and the same key SK are generated between the communication apparatus 20A and the communication apparatus 20B.

In this way, the same shared key K and the same key SK are shared between the communication apparatus 20A and the communication apparatus 20B. Therefore, for example, by using the key SK (i.e., the key SK as the shared key), encrypted communication can be executed between the communication apparatus 20A and the communication apparatus 20B. However, as in Application Example 1 and Application Example 2, for example, the shared key K may be used as the key for encrypted communication.

Note that at Step S418 to Step S419 and Step S422 to Step S423 described above, although the communication apparatus 20A and the communication apparatus 20B use sid to calculate the MAC values, it is not limited as such; instead of sid or together with sid, the MAC values may be calculated by using any predetermined information between the communication apparatus 20A and the communication apparatus 20B. For example, the MAC values may be calculated by using a string that concatenates messages exchanged between the communication apparatus 20A and the communication apparatus 20B in a predetermined order (as a specific example, a string in which $M_1$ and $M_2$ are concatenated in this order where $M_1$ and $M_2$ are the exchanged messages); or the MAC values may be calculated by using a string in which a predetermined number of a predetermined character is arranged (as a specific example, a string "00 . . . 0" in which 0's are arranged in a predetermined number).

Also, as another example of a method of verifying whether the communication apparatus 20A and the communication apparatus 20B generate the same shared key K, for example, the communication apparatus 20A and the communication apparatus 20B may calculate the same key denoted as "key" by the key derivation function using the shared key K, and then, by using this key "key", the communication apparatus 20A and the communication apparatus 20B calculate MAC values from different messages (e.g., messages transmitted by themselves, the identifiers of their own, etc.).

Application Example 4

In the following, Application Example 4 will be described. In Application Example 4, an authenticated key exchange protocol using ID-based encryption on a symmetric pairing group will be described. Note that although a protocol on a symmetric pairing group by itself is not practical at present from the viewpoints of efficiency and safety, a protocol on a symmetric pairing group is important when considering extensions of a protocol on an asymmetric pairing group.

Definition of Symbols

First, symbols used in Application example 4 are defined as follows:

$ID_A$: the identifier of the communication apparatus 20A
$ID_B$: the identifier of the communication apparatus 20B
$D_A$: the user private key of the communication apparatus 20A
$D_B$: the user private key of the communication apparatus 20B
k: a security parameter
p, q: prime numbers satisfying p≠q
G: a subgroup of a group $E(F_p)$ on an elliptic curve $E_1$ where the elliptic curve $E_1$ is on a finite field $F_p$
g: a generator of G
$Z_q$: cosets modulo q
$z \in Z_q$: a master private key
Z=zg: a master public key
$H_1$: a function to generate elements on $Z_q$ from a string (e.g., an octet string)
$H_2$: a function to generate elements on $Z_q$ from a string
$H_3$: a function to generate elements on $Z_q$ from a string
H: a key derivation function
K: a shared key
e: a pairing operation defined on G×G Here, among the symbols defined above, all but the master private key z, the user private keys $D_A$ and $D_B$ are public information. Note that in the case of inputting an element of a group or an element of $Z_q$ into a function, assume that a string representing the element is input into the function.

Key Issuance Process (Application Example 4)

Figure 9:
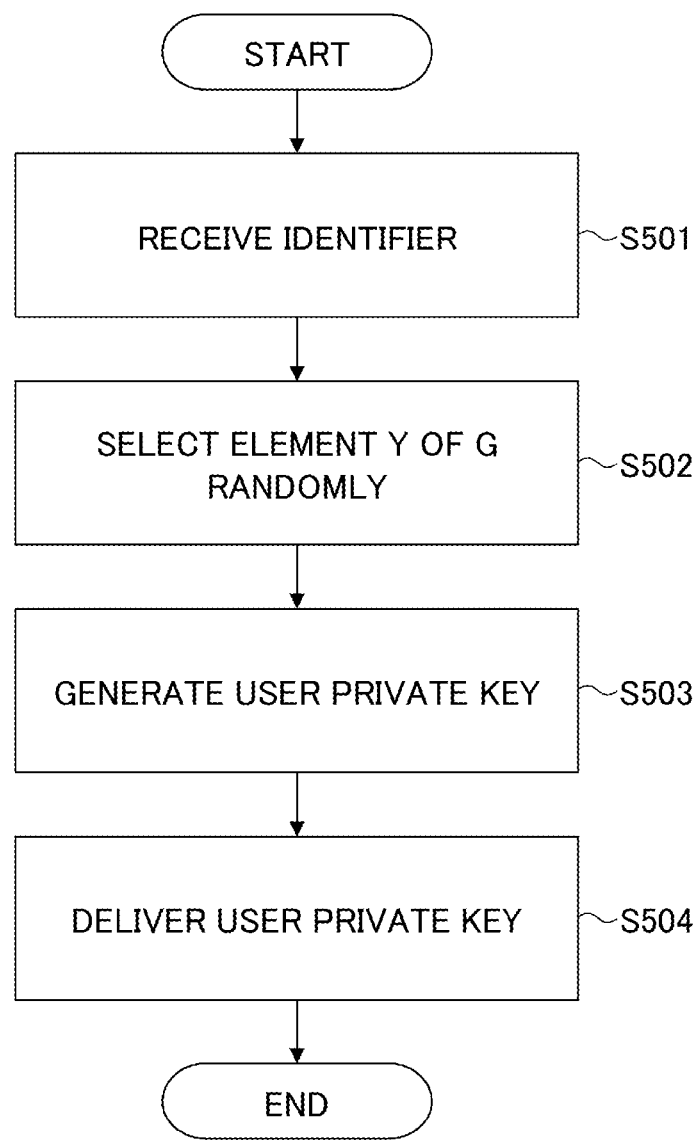
FIG. 9 is a flow chart illustrating an example of a key issuance process (Application Example 4) in the embodiment according to the present invention.

First, a key issuance process for generating a user private key (Application Example 4) will be described with reference to FIG. 9. FIG. 9 is a flow chart illustrating an example of a key issuance process (Application Example 4) in the embodiment according to the present invention. In the following, as an example, a case of issuing a user private key $D_A$ and a user private key $D_B$ will be described.

At Step S501, the key issuance processing unit 102 receives the identifier $ID_A$ of the communication apparatus 20A and the identifier $ID_B$ of the communication apparatus 20B. The identifier of each of the communication apparatuses 20 may be transmitted, for example, from the communication apparatus 20, may be transmitted from a terminal or the like connected to the key issuing apparatus 10 via the communication network N, or may be input on the input device 11 included in the key issuing apparatus 10.

Next, the key issuance processing unit 102 randomly selects Y∈G (Step S502). Next, at Step S503, the key issuance processing unit 102 generates user private keys $D_A$ and $D_B$ by the following formulas:

$$D_A = \frac{1}{z + i_A} Y \qquad \text{[Formula 12]}$$

$$D_B = \frac{1}{z + i_B} Y \qquad \text{[Formula 13]}$$

where $i_A = H_1(ID_A)$ and $i_B = H_1(ID_B)$. These $i_A$ and $i_B$ may be generated on the communication apparatus 20, or may be generated on the key issuing apparatus 10. In other words, for example, when generating a user private key $D_A$, $i_A$ may be generated on the communication apparatus 20 and made public to the key issuing apparatus 10, or $i_A$ may be generated on the key issuing apparatus 10. Similarly, for example, when generating a private key $D_B$, $i_B$ may be generated on the communication apparatus 20 and made public to the key issuing apparatus 10, or $i_B$ may be generated on the key issuing apparatus 10. Note that although it is convenient to generate $i_A$ and $i_B$ on the communication apparatus 20A and the communication apparatus 20B, respectively, for example, in the case where the calculation resources of the communication apparatus 20 are limited and considerable calculation resources are required for the calculation of $H_1$, it is favorable to generate $i_A$ and $i_B$ on the key issuing apparatus 10.

Next, at Step S504, the key issuance processing unit 102 delivers the user private key $D_A$ to the communication apparatus 20A, and delivers the user private key $D_B$ to the communication apparatus 20B. Note that the key issuance processing unit 102 may deliver the user private keys by any method. For example, in response to a request for delivering the user private key from the communication apparatus 20, the key issuance processing unit 102 may cause the communication unit 101 to transmit a corresponding user private key to the communication apparatus 20, so as to deliver the user private key. Alternatively, the user private key may be recorded on a recording medium or the like, and then, delivered to the communication apparatus 20. In this way, each communication apparatus 20 can obtain a user private key used for exchanging (generating) shared keys with another communication apparatus 20.

Key Exchange Process (Application Example 4)

Next, a key exchange process (Application Example 4) for executing authentication between the communication apparatuses 20 by the authenticated key exchange protocol using ID-based encryption, to exchange shared keys will be described with reference to FIG. 10. FIG. 10 is a sequence chart illustrating an example of a key exchange process (Application Example 4) in the embodiment according to the present invention. In the following, as an example, a case will be described in which shared keys are exchanged (generated) between the communication apparatus 20A and the communication apparatus 20B.

At Step S601, the key exchange processing unit 202 of the communication apparatus 20A randomly selects $r_A \in Z_q$, and then, generates a short-term private key as follows, $$x_A = H_2(D_A \| r_A) \quad \text{[Formula 14]}$$

and generates a short-term public key $X_A = x_A(z+i_B)g$. Note that the short-term private key $x_A$ and the short-term public key $X_A$ are stored in the storage unit 203 of the communication apparatus 20A.

Similarly, at Step S602, the key exchange processing unit 202 of the communication apparatus 20B randomly selects $r_B \in Z_q$, and then, generates a short-term private key as follows, $$x_B = H_2(D_B \| r_B) \quad \text{[Formula 15]}$$

and generates a short-term public key $X_B = x_B(z+i_A)g$. Note that the short-term private key $x_B$ and the short-term public key $X_B$ are stored in the storage unit 203 of the communication apparatus 20B.

As Step S603 to Step S609 coming next are substantially the same as Step S203 to Step S209 in FIG. 6, respectively, the description is omitted.

At Step S610, the key exchange processing unit 202 of the communication apparatus 20A calculates a shared value σ as follows:

$$F_A = (x_A + d_A)(X_B + d_B(z+i_A)g)$$

$$\sigma = e(F_A, D_A)$$

Similarly, at Step S611, the key exchange processing unit 202 of the communication apparatus 20B calculates a shared value σ as follows:

$$F_B = (x_B + d_B)(X_A + d_A(z+i_B)g)$$

$$\sigma = e(F_B, D_B)$$

As Step S612 to Step S615 coming next are substantially the same as Step S212 to Step S215 in FIG. 6, respectively, the descriptions are omitted.

In this way, the shared key K is shared between the communication apparatus 20A and the communication apparatus 20B. Therefore, by using this shared key K, encrypted communication can be executed between the communication apparatus 20A and the communication apparatus 20B.

SUMMARY

As described above, in Application Examples 1 to 4 of the embodiment of the present invention, the protocol is designed so that the techniques of the CMQV protocol that is safe in the eCK model in a normal authenticated key exchange can be applied to the authenticated key exchange protocol using ID-based encryption. Note that the eCK model is a safety model in a normal authenticated key exchange, and is a model as the basis of the id-eCK model.

Meanwhile, in a normal authenticated key exchange, pairing operations are not required, and calculation of a power on a cyclic group in a normal authenticated key exchange can be considered as corresponding to pairing operations in the authenticated key exchange protocol using ID-based encryption. Also, CMQV is a protocol that can execute key exchange by executing the calculation of a power only once. Further, the id-eCK model is an eCK model in a normal authenticated key exchange to which authenticated key exchange using ID-based encryption is naturally applied. Therefore, if the core structure of the CMQV protocol can be implemented by an authenticated key exchange protocol using ID-based encryption, a safe protocol can be implemented in the id-eCK model with which key exchange can be performed with a single pairing operation. Note that for details of the CMQB protocol, see, for example, Section 3 and the like of B Ustaoglu, "Obtaining a secure and efficient key agreement protocol from (H)MQV and NAXOS", Designs, Codes and Cryptography, March 2008, Volume 46, Issue 3, pp. 329-342.

However, if CMQV is naturally converted into authenticated key exchange using ID-based encryption on an asymmetric pairing group, the core structure of the CMQV protocol cannot be reproduced. In contrast, in Application Examples 1 to 4 of the embodiment of the present invention, by using the structure of the McCullagh-Barreto key exchange protocol, the protocol is designed so that the core structure of the CMQV protocol can be implemented by the authenticated key exchange using ID-based encryption. By this design, in Application Examples 1 to 4 of the embodiment of the present invention, the protocol is implemented with which key exchange can be executed in a single pairing operation, and safety in the id-eCK model is secured. Note that for details of the McCullagh-Barreto key exchange protocol, see a reference, for example, by Zhaohui Cheng, Liqun Chen, "On Security Proof of McCullagh-Barreto's Key Agreement Protocol and its Variants", Cryptology ePrint Archive, Report 2005/201, 2005.

Note that focusing only on the number of pairing operations, in the embodiment according to the present invention, shared keys K (or keys SK) can be exchanged by executing the pairing operation only once on each of the communication apparatuses 20. In contrast, as described above, for example, in FSU, pairing operations need to be executed for four times. Therefore, in the embodiment according to the present invention, compared to the conventional techniques, each of the communication apparatuses 20 can execute key exchange in approximately a quarter of the time. Therefore, according to the embodiment of the present invention, for example, the authenticated key exchange protocol using ID-based encryption can be executed at high speed even on an IoT device having limited calculation resources.

The present invention is not limited to the embodiment specifically disclosed as above, and various alterations and variations can be made without deviating from the scope of the claims.

The present application is based on a base application No. 2019-132060, filed on Jul. 17, 2019, in Japan, the entire contents of which are hereby incorporated by reference.

DESCRIPTION OF REFERENCE CODES 1 key exchange system
10 key issuing apparatus
20 communication apparatus
101 communication unit
102 key issuance processing unit
103 storage unit
201 communication unit
202 key exchange processing unit
203 storage unit

The invention claimed is:

1. A key exchange system comprising:
a communication apparatus and another communication apparatus,
wherein the key exchange system generates a shared key for executing encrypted communication between the communication apparatus and said another communication apparatus from among a plurality of communication apparatuses according to an authenticated key exchange protocol,
the authenticated key exchange protocol uses ID-based encryption, and,
the communication apparatus comprises a memory and a processor configured to execute operations comprising:
generating a short-term private key by using a first element on coset modulo a prime number from a private key of the communication apparatus,
generating a short-term public key of the communication apparatus by using a second element on coset modulo the prime number from the short-term private key,
generating private information associated with the communication apparatus by using a third element on coset modulo the prime number from the short-term private key, a short-term public key generated by said another communication apparatus, public information associated with the communication apparatus and said another communication apparatus, and
generating the shared key for executing encrypted communication with said another communication apparatus by executing a pairing operation, wherein the pairing operation comprises computing on an elliptic curve using the private key of the communication apparatus and the private information associated with the communication apparatus.

2. The key exchange system as claimed in claim 1, wherein the processor is further configured to execute operations comprising:
generating a key denoted as "key" from the shared key by a mask generation function,
calculating a MAC value of the key "key", and
verifying the MAC value and a MAC value calculated by said another communication apparatus.

3. The key exchange system as claimed in claim 1, wherein the public information includes:
a first output value corresponding to an output value of a predetermined function taking as input the short-term public key of the communication apparatus, an identifier of the communication apparatus, and an identifier of said another communication apparatus; and
a second output value corresponding to a second output value of the predetermined function taking as input the short-term public key of said another communication apparatus, the identifier of the communication apparatus, and the identifier of said another communication apparatus.

4. The key exchange system according to claim 1, wherein the public information is generated by the communication apparatus and said another communication apparatus.

5. The key exchange system according to claim 1, wherein the public information is generated by a key delivering center.

6. A communication apparatus for generating a shared key for executing encrypted communication with another communication apparatus according to an authenticated key exchange protocol using ID-based encryption, the communication apparatus comprising:
a memory; and
a processor configured to execute operations comprising:
generating a short-term private key by using a first element on coset modulo a prime number from a private key of the communication apparatus;
generating a short-term public key of the communication apparatus by using a second element on coset modulo the prime number from the short-term private key;
generating private information associated with the communication apparatus by using a third element on coset modulo the prime number from the short-term private key, a short-term public key generated by said another communication apparatus, public information associated with the communication apparatus and said another communication apparatus; and
generating the shared key for executing encrypted communication with said another communication apparatus by executing a pairing operation, wherein the pairing operation comprises computing on an elliptic curve using the private key of the communication apparatus and the private information associated with the communication apparatus.

7. A method for generating a shared key for executing encrypted communication between a communication apparatus and another communication apparatus from among a plurality of communication apparatuses according to an authenticated key exchange protocol using ID-based encryption, the method comprising:
generating a short-term private key by using a first element on coset modulo a prime number from a private key of the communication apparatus;
generating a short-term public key of the communication apparatus by using a second element on coset modulo the prime number from the short-term private key;
generating private information associated with the communication apparatus by using a third element on coset modulo the prime number from the short-term private key, a short-term public key generated by said another communication apparatus, public information associated with the communication apparatus and said another communication apparatus; and generating the shared key for executing encrypted communication with said another communication apparatus by executing a pairing operation, wherein the pairing operation comprises computing on an elliptic curve using the private key of the communication apparatus and the private information associated with the communication apparatus.

8. A non-transitory computer-readable recording medium having computer-readable instructions stored thereon, which when executed, cause a computer including a memory and a processor to execute respective operations in the communication apparatus as claimed in claim 6.

\* \* \* \* \*